United States Patent
Wang

(10) Patent No.: US 10,271,102 B2
(45) Date of Patent: Apr. 23, 2019

(54) SYSTEMS AND METHODS FOR CONFLICT DETECTION BASED ON USER PREFERENCES

(71) Applicant: Rovi Guides, Inc., San Carlos, CA (US)

(72) Inventor: Ti-Shiang Wang, Lexington, MA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 15/657,831

(22) Filed: Jul. 24, 2017

(65) Prior Publication Data
US 2019/0028765 A1    Jan. 24, 2019

(51) Int. Cl.
| | |
|---|---|
| H04N 21/45 | (2011.01) |
| H04N 21/458 | (2011.01) |
| H04N 21/435 | (2011.01) |
| H04N 21/472 | (2011.01) |
| H04N 21/2187 | (2011.01) |

(52) U.S. Cl.
CPC ..... *H04N 21/4583* (2013.01); *H04N 21/2187* (2013.01); *H04N 21/435* (2013.01); *H04N 21/45* (2013.01); *H04N 21/4532* (2013.01); *H04N 21/47202* (2013.01)

(58) Field of Classification Search
CPC ............................ H04N 21/45; H04N 21/4583
See application file for complete search history.

(56) References Cited

U.S. PATENT DOCUMENTS

| | | | |
|---|---|---|---|
| 6,239,794 B1 | 5/2001 | Yuen et al. | |
| 6,505,348 B1 * | 1/2003 | Knowles | H04N 5/44543 348/E5.103 |
| 6,564,378 B1 | 5/2003 | Satterfield et al. | |
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 8,798,444 B1 * | 8/2014 | Crandall | H04N 21/4334 386/292 |
| 2002/0174430 A1 | 11/2002 | Ellis et al. | |
| 2005/0251827 A1 | 11/2005 | Ellis et al. | |
| 2007/0171198 A1 * | 7/2007 | Yokozawa | G06F 3/1423 345/156 |
| 2009/0007184 A1 * | 1/2009 | Nakamura | H04N 5/782 725/58 |
| 2010/0107185 A1 * | 4/2010 | Shintani | H04N 21/4126 725/25 |
| 2010/0109973 A1 * | 5/2010 | Byun | H04L 12/2821 345/2.1 |
| 2010/0153885 A1 | 6/2010 | Yates | |

(Continued)

*Primary Examiner* — Robert J Hance
(74) *Attorney, Agent, or Firm* — Haley Guiliano LLP

(57) ABSTRACT

Systems and methods for detecting a conflict between viewing selections of two users. In some aspects, the method comprises generating for display a first media asset on a user equipment device, receiving a second request from a second user to generate for display a second media asset on the user equipment device, determining a first priority and a second priority associated with the first user and the second user, and based on determining that a first scheduled time period of the first media asset and a second scheduled time period of the first media asset overlap and the first priority is higher than the second priority, generating for display on the user equipment device an indication of a conflict between the first request and the second request.

16 Claims, 6 Drawing Sheets

(56) References Cited

U.S. PATENT DOCUMENTS

| | | | |
|---|---|---|---|
| 2012/0224834 A1* | 9/2012 | Chen | H04N 5/765 386/293 |
| 2013/0229582 A1* | 9/2013 | Du | H04N 21/42203 348/734 |
| 2013/0243388 A1* | 9/2013 | Du | H04N 5/772 386/224 |
| 2014/0152899 A1* | 6/2014 | Newell | H04N 5/44 348/734 |
| 2014/0253816 A1* | 9/2014 | Shin | H04N 5/4403 348/734 |
| 2015/0042887 A1* | 2/2015 | Schanin | H04N 21/43635 348/706 |
| 2015/0178227 A1* | 6/2015 | Salmela | H04N 21/4122 710/72 |
| 2017/0070762 A1* | 3/2017 | Natarajan | H04N 21/25816 |

* cited by examiner

SYSTEMS AND METHODS FOR CONFLICT DETECTION BASED ON USER PREFERENCES

BACKGROUND

Different users sitting in a room may have varied preferences regarding the media assets they would like to view on a user equipment device. Conventionally, a first user may be watching a first media asset and the second user may walk into the room and arbitrarily change the media asset on display from the first media asset to a second media asset of the second user's preference. Conventional media guidance applications will instantly change the media asset upon a request from the second user without providing the first user an opportunity to choose to resolve the conflict. This may be frustrating for the users as they need to spend time determining whether their different preferences conflict and may cause them to miss the scheduled times of their preferred media assets.

SUMMARY

Systems and methods are provided herein for detecting a viewing conflict between a first user and a second user based on the request of the first user to display a first media asset on a user equipment device and the request of the second user to display a second media asset on the user equipment device. For example, a first user may be watching a first media asset, such as a "football match" between two major league soccer teams, New York City Football Club (NYCFC) and New York Red Bulls (NYRB), being broadcast on a first channel. A second user may want to view a movie, such as "Man of Steel," on the user equipment device. The second user may request to display the movie, "Man of Steel," on the user equipment device while the first user is watching the football match, "NYCFC v NYRB." The media guidance application implemented at the user equipment device, e.g., a television, may determine whether the scheduled time periods of the two media assets overlap. The media guidance application also calculates a first priority of assigned to the first user and a second priority assigned to the second user to determine whether the user equipment device displays the first media asset or the second media asset, or whether the user equipment device displays an indication of the viewing conflict between the first user and the second user.

Conventional means instead instantly change the media asset being displayed on the user equipment device from the first media asset to the second media asset on the request of one of the first user and the second user. The described systems and methods of detecting a viewing conflict between the first user and the second user are an improvement over conventional means because the described systems and methods determine whether the viewing times of the first media asset and the second media asset conflict and/or the priority level of the first user and the second user before changing the media asset being displayed on the user equipment device.

In some aspects, systems and methods to detect a conflict between a group of people is based on their interactions with one or more user devices, e.g., in browsing a guide page on a media guidance application, which in some embodiments is the first access to a user equipment device before watching a media asset. Before any media asset is selected, the media guidance application detects whether there are at least two users trying to browse different media assets on the guide page in a predetermined time period. For example, the first user and the second user may browse through the various media assets on a first user device and a second user device, respectively. In some embodiments, the first user and the second user may browse the guide page on a first portion of the screen of a user equipment device and a second portion of the screen of the user equipment device using a single user device. In some embodiments, the number of users operating the remote control may be determined by the number of remote controls used for the user equipment device in given predetermined time frame. In some embodiments, the media guidance application detects the presence of the first user and the second user based on the detection of the first user and the second user switching through at least two media assets using at least one user device.

In some aspects, systems and methods to detect a viewing conflict between the first user and the second user is based on their interactions with at least one or more user devices while watching a media asset. In some embodiments, the first user watches a first media asset, e.g., a "football game" (NYCFC v NYRB), on a user equipment device, the second user requests to display a second media asset, e.g., a movie ("Man of Steel"), on the user equipment device. The media guidance application determines whether the scheduled time periods of the first media asset and the second media asset overlap, and the priority levels of the first user and the second user. Based on determining that the scheduled time periods for the first media asset and the second media asset overlap and the priority of the first user and the second user, the media guidance application determines whether the viewing preferences of the first user and the second user conflict. In some embodiments, a time period of a media asset is composed of a scheduled time and a duration of the corresponding media asset. In some embodiments, a time period of a media asset is composed of a scheduled start time and a scheduled end time of the corresponding media asset. In some embodiments, where the first user and the second user select to watch the same media asset, the viewing conflict between the first user and the second user may occur in the difference in display settings preferred by the first user and the second user. For example, the first user and the second user may have different volume preferences. The proposed systems and methods detect conflict in the same media asset with respect to different volume preferences.

In some embodiments, the first user requests to generate a first media asset to display on a user equipment device. For example, the first user may request to generate a "football match" between NY City Football Club and the NY Red Bulls. The second user requests to generate a second media asset on the user equipment device, while the first media asset is being displayed on the user equipment device. The media guidance application determines a first priority associated with the first user and a second priority associated with the second user and the media guidance application determines a first scheduled time period of the first media asset and a second scheduled time period of the second media asset. For example, the media guidance application determines the broadcast time of the "football game" and the "Man of Steel" media assets. Based on the first priority, the second priority, the first scheduled time period and the second scheduled time period, the media guidance application determines whether a conflict exists between the first request and the second request by detecting whether the first scheduled time period and the second scheduled time period overlap. Based on determining that the first scheduled time period and the second scheduled time period overlap, determining whether the first priority of the first user is higher than the second priority of the second user and based on determining that the first priority of the first user is higher than the second priority of the second user, determining that the conflict exists between the first request and the second request; and generating for display, on the user equipment device, an indication of the conflict between the first request and the second request. For example, the first user is watching a first media asset "NYCFC v NYRB" and the second user requests to watch a second media asset "Man of Steel" on the user equipment device. A first scheduled time for the first media asset ("NYCFC v NYRB") may be 6 PM-8 PM and a second scheduled time for the second media asset ("Man of Steel") may be 7 PM-9:30 PM. The first user may have a first priority and the second user may have a second priority lower than the first priority. The media guidance application determines that the first scheduled time period and the second scheduled time period overlap and generates for display on the user equipment device a viewing conflict between the first user watching the first media asset ("NYCFC v NYRB") and the second user watching the second media asset ("Man of Steel").

In some embodiments, the media guidance application determining whether the first scheduled time period and the second scheduled time period overlap further comprises the media guidance application extracting, from memory, a first scheduled time and a first duration of the first media asset and a second scheduled time and a second duration of the second media asset, from a first metadata of the first media asset and a second metadata of a second media asset, respectively, determining the conflict when the first scheduled time is within the second duration after the second scheduled time, and determining the conflict when the second scheduled time is within the first duration after the first scheduled time. For example, the first media asset ("NYCFC v NYRB") is scheduled for 6 PM-8 PM and the second media asset is scheduled for 7 PM-9:30 PM. The scheduled time of the second media asset ("Man of Steel") is within the duration of the first media asset ("NYCFC v NYRB"). In some embodiments, the media guidance application queues the second media asset to be generated for display on the user equipment device after the first media asset based on the determining that the second scheduled time is after the first duration after the first scheduled time. For example, the scheduled time for the second media asset ("Man of Steel") may be 9 PM-11.30 PM. As the scheduled time of the second media asset ("Man of Steel") is after the scheduled time of the first media asset ("NYCFC v NYRB") which is scheduled between 6 PM-8 PM. The media guidance application queues the second media asset ("Man of Steel") to be displayed on the user equipment device after the first media asset ("NYCFC v NYRB"). In some embodiments, a first interaction of the first user with the media guidance application may be received via a first user device and a second interaction of the second user with the media guidance application is received through a second device, wherein the first device and the second device are connected to the user equipment device via a network. For example, the first user may interact with the media guidance application implemented on the user equipment device via a first user device like a remote, a phone, tablet for example. In addition, the second user may interact with the media guidance application using the first user device or a second user device such as a remote, a phone, or tablet as example. The first user device and the second user device are connected to the user equipment device through a network like an internet.

In some embodiments, he media guidance application generating of the indication of the viewing conflict between the first user device and the second user device for display on the user equipment device further comprises the media guidance application displaying the first metadata of the first media asset, e.g., "NYCFC v NYRB," and the second metadata of the second media asset, e.g., "Man of Steel," on the user equipment device. For example, displaying of the conflict between the first user and the second user includes displaying on the user equipment device metadata associated with the first media asset, e.g., "NYCFC v NYRB," and the second media asset, e.g., "Man of Steel." The metadata may include scheduled times and channel on which the first media asset, e.g., "NYCFC v NYRB," and the second media asset, e.g., "Man of Steel," are being broadcast. In some embodiments, at least one of the first media asset and the second media asset may be recorded previously by the media guidance application. In the case that the first priority is higher than the second priority, the media guidance application replaces the first media asset, e.g., "NYCFC v NYRB," with the second media asset, e.g., "Man of Steel," on the user equipment device. Based on determining that the second priority is lower than the first priority, generating for display, on the user equipment device, the second user's request to view the second media asset, e.g., "Man of Steel," on the user equipment device, wherein the first user has an option to accept or reject the second user's request to view the second media asset, e.g., "Man of Steel." In the above example, because the priority of the first user is higher than the priority of the second user, the media guidance application displays the request of the second user to display the second media asset on the user equipment device while the first media asset is being displayed. The first user is provided the option to accept or reject the request of the first user. In some embodiments, the first user may be determined to have a first priority and the second user may be determined to have a second priority where the second priority may be greater than the first priority. In that case, the second media asset, e.g., "Man of Steel," replaces the first media asset, e.g., "NYCFC v NYRB," on the user equipment device. The media guidance application may display an alert on the user equipment device informing the first user and the second user that the first media asset is replaced with the second media asset on the user equipment device.

In some embodiments, in response to determining that the second media asset replaces the first media asset on the user equipment, the media guidance application records a remaining portion of the first media asset, and, in response to receiving a rejection of the second user's request from the first user, the media guidance application records the second media asset. For example, where the request of the second user is rejected, the media guidance application records the second media asset, e.g., "Man of Steel." In the case that the second media asset, e.g., "Man of Steel," replaces the first media asset, e.g., "NYCFC v NYRB," on the user equipment device, the media guidance application records the remaining portion of the first media asset.

In some embodiments, determining of the first priority further comprises determining whether the first media asset is being broadcast live and, in response to determining that the first media asset is being broadcast live, assigning the first priority a value higher than the second priority, in response determining that the first media asset is not being broadcast live, and the second media asset is being broadcast live, the media guidance application replaces the first media asset with the second media asset for display on the user equipment device. For example, the first media asset is a football match between the New York City Football Club and the New York Red Bulls is broadcast live whereas the second media asset "Man of Steel" is a movie that has been broadcast before, therefore is not live. In this example, the "NYCFC v NYRB" game will take priority over the "Man of Steel" movie. In some embodiments, the first priority and the second priority may be determined based on which user of the first user and the second user turned the user equipment device n first. In some embodiments, the priority may also be determined based on the owner of the user equipment device.

In some embodiments, the media guidance application determining whether the conflict exists further comprises the media guidance application receiving a first set of settings for generating the first media asset on the user equipment device from the first user, receiving a second set of settings for generating the first media asset on the user equipment device from the second user, determining a difference in at least one setting between the first set of settings and the second set of settings for generating the first media asset, and generating for display on the user equipment device the conflict of the difference in at least one setting received from the first user and the second user. For example, the first user and the second user may be watching the same media asset ("Man of Steel"), but the first user may wish to have the volume at "35" and the second user may want a louder volume setting of "66". The selection of the different settings by the first user and the second user is displayed as a conflict on the user equipment device. In some embodiments, the settings may be any number of picture color settings or sound settings.

It should be noted that the systems, methods, apparatuses, and/or aspects described above may be applied to, or used in accordance with, other systems, methods, apparatuses, and/or aspects described in this disclosure.

BRIEF DESCRIPTION OF DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are described herein for detecting a viewing conflict between a first user and a second user based on the request of the first user to display a first media asset on a user equipment device and the request of the second user to display a second media asset on the user equipment device. For example, a first user may be watching a first media asset (like a "football match" between two major league soccer teams New York City Football Club (NYCFC) and New York Red Bulls (NYRB)) being broadcast on a first channel. A second user may want to view a movie "Man of Steel" on the user equipment device. The second user may request to display the movie ("Man of Steel") on the user equipment device while the first user is watching the football match ("NYCFC v NYRB"). The media guidance application implemented at the user equipment device (a television, for example) may determine whether the times of the two media assets overlap. The media guidance application also calculates a first priority of assigned to the first user and a second priority assigned to the second user to determine whether the user equipment device displays the first media asset or the second media asset or whether the user equipment device displays an indication of the viewing conflict between the first user and the second user.

Figure 1:
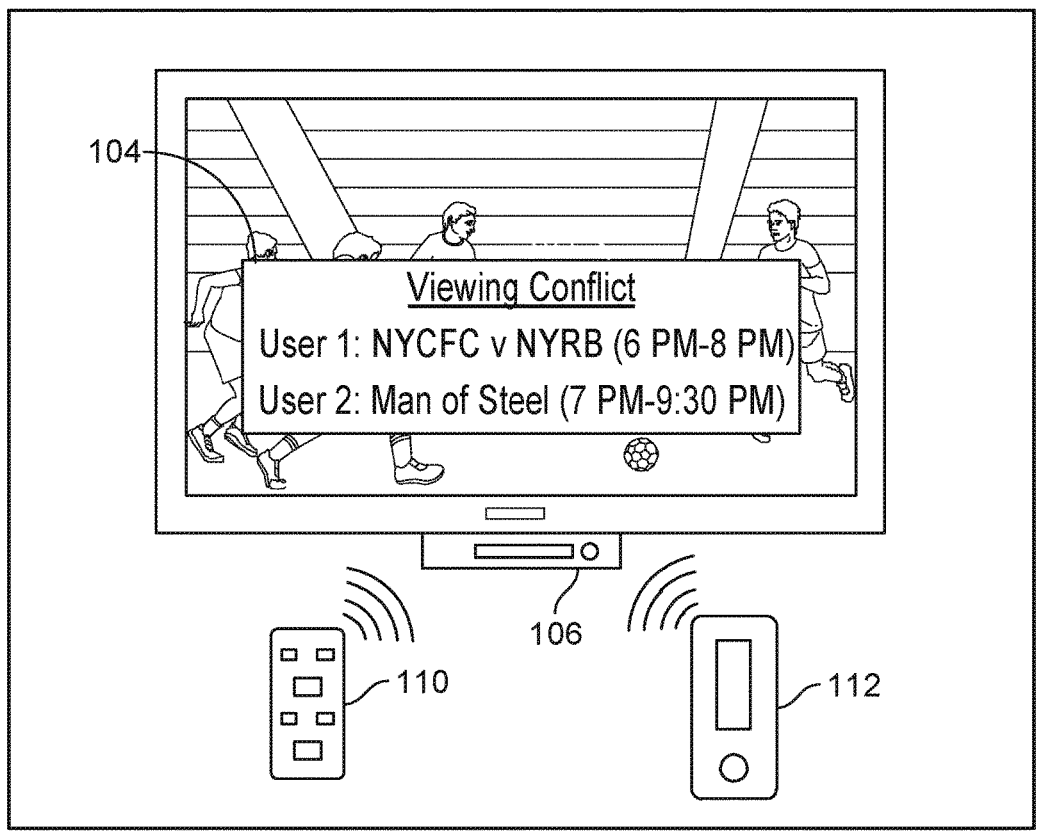
FIG. 1 shows an illustrative example of an interaction between a media guidance application and a user, the interaction containing viewing conflict, in accordance with some embodiments of the disclosure.

FIG. 1 shows an illustrative example of an interaction between a media guidance application and a user, the media guidance application depicting a viewing conflict between a first user and a second user, in accordance with some embodiments of the disclosure. As depicted, FIG. 1 includes a user equipment device 106, user devices 110 and 112. User equipment device 106 may include, for example, a TV, a computer, an intelligent personal assistant (IPA), a smartphone, and the like. The user equipment device 106 may execute a media guidance application while the user equipment device 106 does not generate a media asset for display.

As shown in FIG. 1, the media guidance application may detect a request from a first user device 110 to display a first media asset, e.g., "NYCFC v NYRB," on user equipment device 106. The media guidance application may receive a request from a second user device 112 to display a second media asset, e.g., "Man of Steel," on the user equipment device 106. In some embodiments, the user devices 110 and 112 may be connected to each other and to the media guidance application over a network. In some embodiments, the first user and the second user may request the different media assets from the same user device 110. In some embodiments, the first user and the second user may request different media assets from different accounts on the same user device 110 or 112. For example, the first user and the second user may browse through the various media assets on a first user device 110 and a second user device 112 separately. In some embodiments, the first user and the second user may browse the guide page on a first portion of the user equipment device 106 and a second portion of the user equipment device 106 using a single user device 110 or 112. In some embodiments, the number of users operating the remote control may be determined by the number of remote controls used to give commands to the user equipment device 106 in given predetermined time frame. In some embodiments, the media guidance application detects the presence of the first user and the second user based on the detection that the first user and the second user switch through at least two media assets using at least one user device 110.

The media guidance application determines the scheduled time period of the first media asset, e.g., "NYCFC v NYRB," and the scheduled time period of second media asset, e.g., "Man of Steel," from the requests received from the first user device 110 and the second user device 112 controlled by the first user and the second user, respectively. In some embodiments, a time period of a media asset is composed of a scheduled time and a duration of the corresponding media asset. In some embodiments, a time period of a media asset is composed of a scheduled start time and a scheduled end time of the corresponding media asset. As shown in the viewing conflict 104 in FIG. 1, the media guidance application determines that the football match "NYCFC v NYRB" is scheduled between 6 PM-8 PM and the "Man of Steel" movie is scheduled between 7 PM-9:30 PM. The media guidance application also calculates a first priority of assigned to the first user and a second priority assigned to the second user to determine whether the user equipment device 106 displays the first media asset, e.g., "NYCFC v NYRB," or the second media asset, e.g., "Man of Steel," or whether the user equipment device 106 displays an indication of the viewing conflict between the first user and the second user. In some embodiments, the first priority and the second priority may be assigned to the first user and the second user based on a relationship between the first user and the second user. For example, the first user may be a father watching the football game "NYCFC v NYRB." The second user may be the child of the father and requests to watch the movie "Man of Steel." In such an example, the first user (father) may be assigned a first priority higher than the second priority assigned to the second user (child). In some embodiments, the first priority and second priority may be assigned based on a choice made by the first user and the second user, or based on other priority assignments (ownership, first user appearance, or sequence in turning on user equipment device, for example).

In some embodiments when the second user with the lower priority requests to display the second media asset, e.g., "Man of Steel," while the first media asset, e.g., "NYCFC v NYRB," is being displayed on user equipment device 106 from a request of the first user with the lower priority, the media guidance application may display a viewing conflict 104 between the first user and the second user. In some embodiments, the viewing conflict 104 displayed on the user equipment device 106 displays metadata associated with the first media asset, e.g., "NYCFC v NYRB," and metadata associated with the second media asset, e.g., "Man of Steel." In some embodiments, the viewing conflict may also display an option to the first user to select the media asset he wishes to watch on the user equipment device 106. The media guidance application, determines a conflict the scheduled time periods of the first media asset, e.g., "NYCFC v NYRB," and the second media asset, e.g., "Man of Steel," and the first priority and the second priority and based on the calculated times and the first priority and the second priority, generates an alert 104 to display the conflict between the first user and the second user on the user equipment 106, in order to inform the first user and the second user about the viewing conflict between the first request, e.g., football match ("NYCFC v NYRB") and the second request, e.g., "Man of Steel" movie. In case the first user accepts to display the first media asset, e.g., "NYCFC v NYRB," or the second media asset, e.g., "Man of Steel," the other media asset may be recorded by the media guidance application for the users to watch later.

In some embodiments, the media guidance application may be configured to prioritize a program that is being broadcast live, to a program that has been previously recorded. In some embodiments, the media guidance application may be configured to prioritize news over all other content. In some embodiments, the media guidance application may be configured to prioritize a certain collection of programs over another by the users associated with the user equipment device 106.

Figure 2:
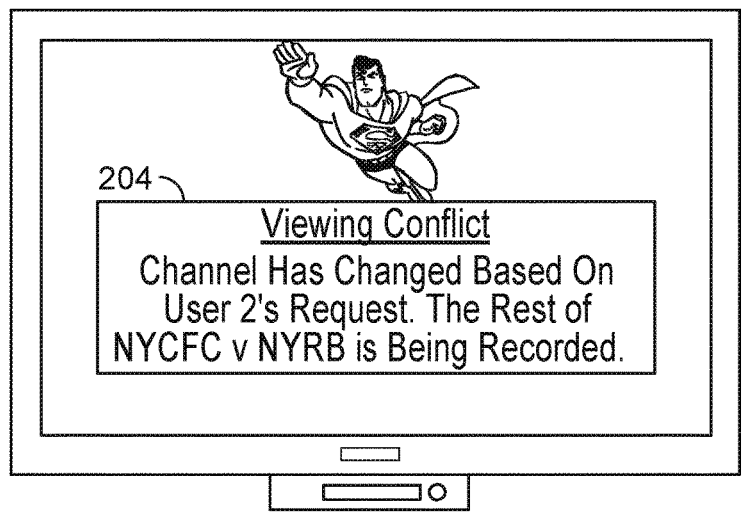
FIG. 2 shows an illustrative example of a depiction of a viewing conflict, in accordance with some embodiments of the disclosure.

FIG. 2 shows an illustrative example of an interaction between a media guidance application and a user, the media guidance application depicting a viewing conflict between a first user and a second user, in accordance with some embodiments of the disclosure. As depicted, FIG. 2 contains user equipment device 206. User equipment device 206 may include, for example, a TV, a computer, an intelligent personal assistant (IPA), a smart-phone, and the like. The user equipment device 206 may execute a media guidance application. The user equipment device 206 includes viewing conflict notification 204. Viewing conflict notification shows that the second media asset, e.g., "Man of Steel," requested by the second user replaces a first media asset, e.g., "NYCFC v NYRB." In some embodiments, the second media asset, e.g., "Man of Steel," replaces the first media asset, e.g., "NYCFC v NYRB," because the second priority assigned to the second user may be greater than the first priority assigned to the first user. In some embodiments, when the second media asset, e.g., "Man of Steel," replaces the first media asset, e.g., "NYCFC v NYRB," the remaining part of the first media asset, e.g., "NYCFC v NYRB," is recorded by the media guidance application.

Figure 3:
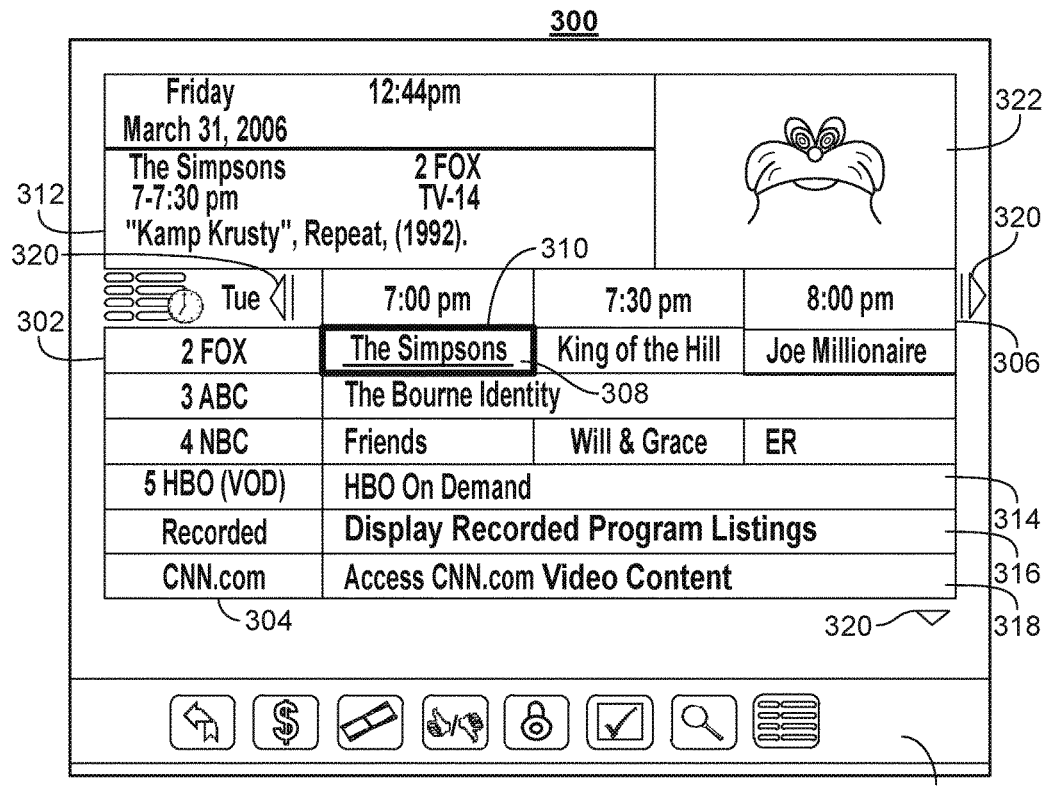
FIG. 3 shows an illustrative embodiment of a display screen that may be used to provide media guidance application listings or other media guidance information, in accordance with some embodiments of the disclosure.
Figure 4:
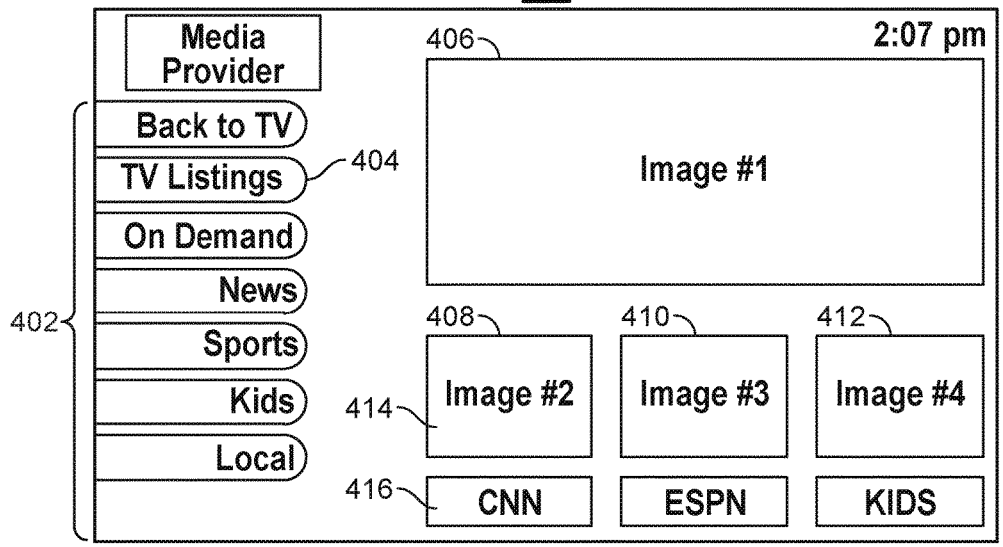
FIG. 4 shows another illustrative embodiment of a display screen that may be used to provide media guidance application listings, in accordance with some embodiments of the disclosure.

FIGS. 3-4 show illustrative display screens that may be used to provide media guidance data. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
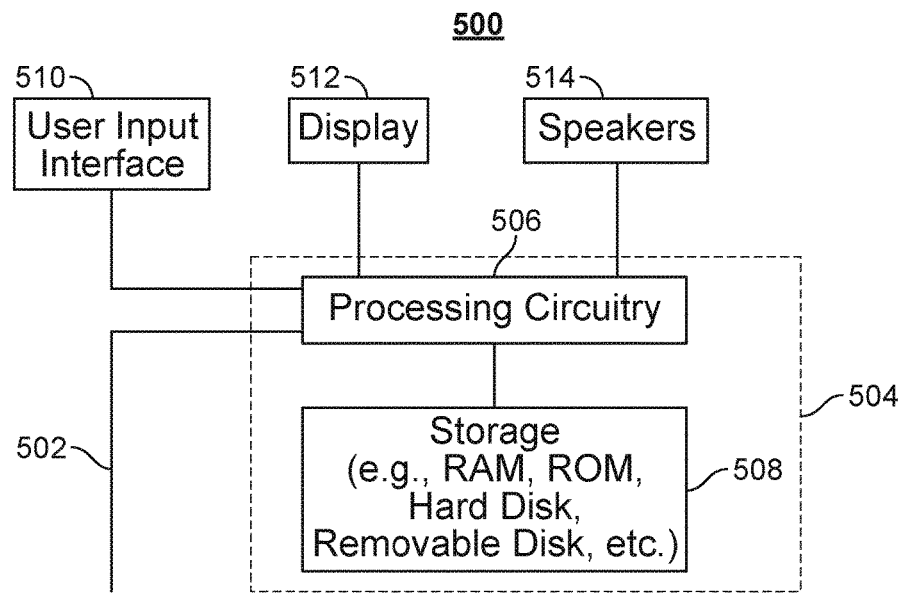
FIG. 5 is a block diagram of an illustrative user equipment (UE) device in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
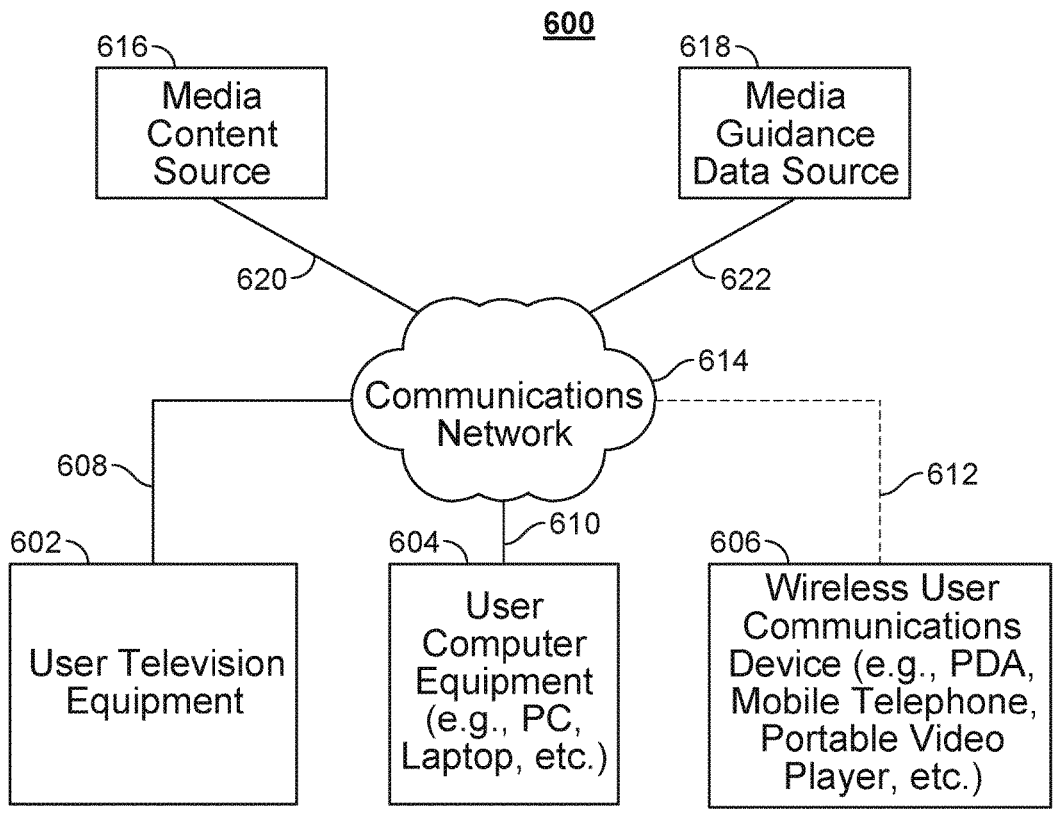
FIG. 6 is a block diagram of an illustrative media system, in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

As referred herein, the term "in response to" refers to initiated as a result of For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 7:
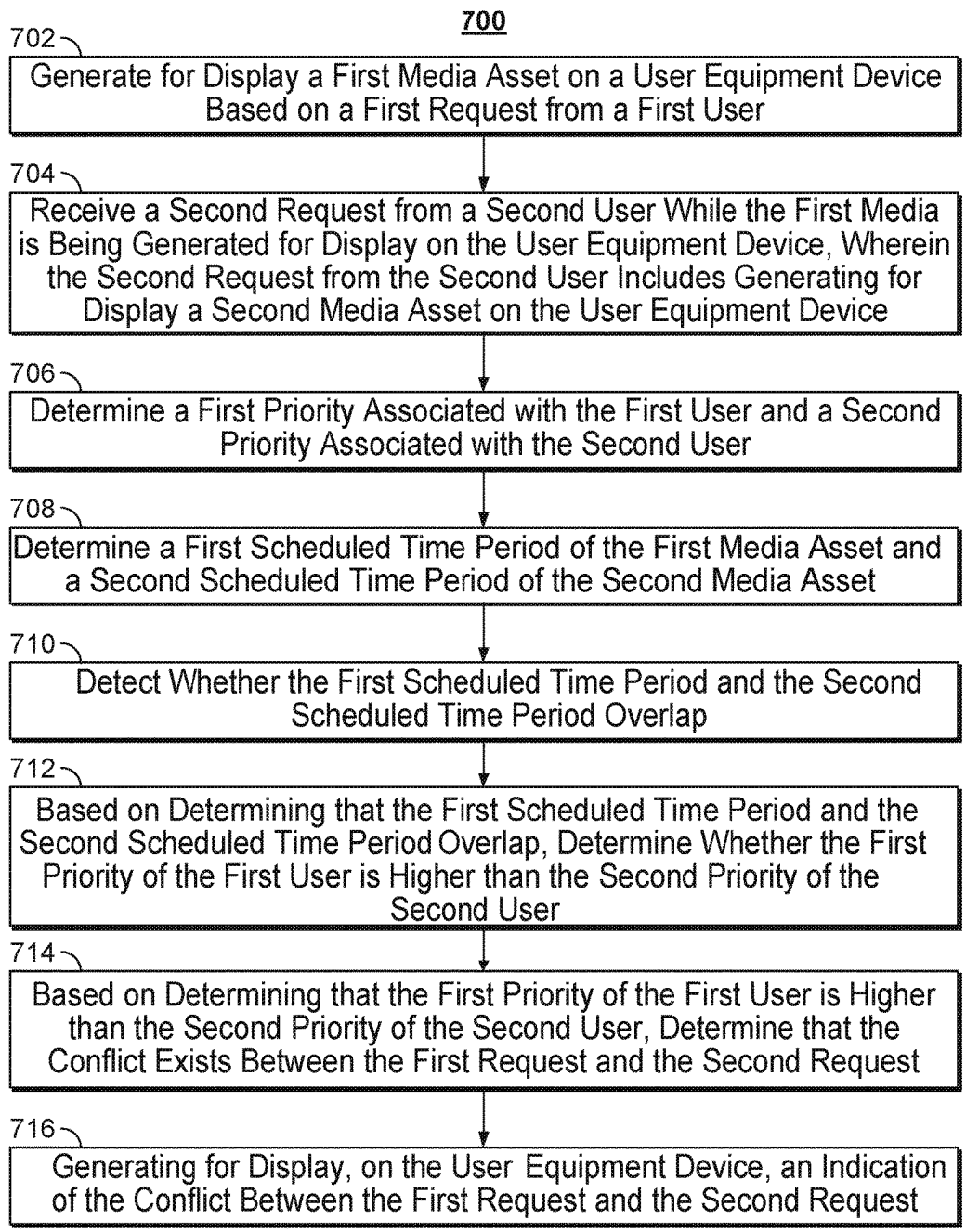
FIG. 7 depicts an illustrative flowchart of a process for detecting viewing conflicts based on user preferences, in accordance with some embodiments of the disclosure.

FIG. 7 depicts an illustrative flowchart of a process for detecting viewing conflicts based on user preferences, in accordance with some embodiments of the disclosure. Process 700 may be executed by control circuitry 504 (e.g., in a manner instructed to control circuitry 504 by the media guidance application). Control circuitry 504 may be part of remote server separated from the user equipment device 104 by of communication network 614.

Process 700 begins at 702, when control circuitry 504 generates for display, a first media asset, e.g., "NYCFC v NYRB," on a user equipment device 106 based on a first request from a first user.

At 704, control circuitry 504 receives a second request from a second user while the first media asset, e.g., "NYCFC v NYRB," is being generated for display on the user equipment device 106, wherein the second request from the second user includes generating for display a second media asset, e.g., "Man of Steel," on the user equipment device 106. In some embodiments, the first request and the second request may be received from the first user and the second user via a first user device 110 and a second user device 112 connected to each other and media guidance application 106. In some embodiments, both the first user and the second user may interact with the first user device 110.

At 706, control circuitry 504 determines a first priority associated with the first user and a second priority associated with the second user. In some embodiments, the first priority and the second priority may be assigned based on preferences of the different users associated with the user equipment device 106. In some embodiments, the first priority and the second priority may be assigned to the first user and the second user based on a relationship between the first user and the second user. For example, the first user may be a father watching the football game, "NYCFC v NYRB." The second user may be the child of the father and requests to watch the movie, "Man of Steel." In such an example, the first user, e.g., the father, may be assigned a first priority higher than the second priority assigned to the second user, e.g., a child. In some embodiments, the first priority and second priority may be assigned based on a choice made by the first user and the second user. The assignment of priority is described in more detail in FIG. 1.

At 708, control circuitry 504 determines a first scheduled time period of the first media asset and a second scheduled time period of the second media asset. In some embodiments, a time period of a media asset is composed of a scheduled time and a duration of the corresponding media asset. In some embodiments, a time period of a media asset is composed of a scheduled start time and a scheduled end time of the corresponding media asset. For example, as described in FIG. 1, the scheduled time period of the first media asset ("NYCFC v NYRB") is 6 PM-8 PM and the scheduled time period of the second media asset ("Man of Steel") has a second scheduled time of ("Man of Steel") 7 PM-9:30 PM.

At 710, the control circuitry 504 detects whether the first scheduled time period and the second scheduled time period overlap. In some embodiments, determining whether the first scheduled time period and the second scheduled time period overlap further comprises extracting, from memory, a first scheduled time and a first duration of the first media asset and a second scheduled time and a second duration of the second media asset, from a first metadata of the first media asset, e.g., "NYCFC v NYRB," and a second metadata of a second media asset, e.g., "Man of Steel," respectively. Determining the first scheduled time period and the second scheduled time period overlap further comprises determining whether the first scheduled time is within the second duration after the second scheduled time, or the second scheduled time is within the first duration after the first scheduled time. As in the above example, the second scheduled time of the second media asset ("Man of Steel") is scheduled between 7 PM-9:30 PM, within the duration of the first media asset ("NYCFC v NYRB") that is scheduled between 6 PM-8 PM. In some embodiments, the media guidance application queues the second media asset to be generated for display on the user equipment device after the first media asset based on the determining that the second scheduled time is after the first duration after the first scheduled time. For example, the scheduled time for the second media asset ("Man of Steel") may be 9 PM-11.30 PM. As the scheduled time of the second media asset ("Man of Steel") is after the scheduled time of the first media asset ("NYCFC v NYRB") which is scheduled between 6 PM-8 PM. The media guidance application queues the second media asset ("Man of Steel") to be displayed on the user equipment device after the first media asset ("NYCFC v NYRB").

At 712, the control circuitry 504 determines whether the first priority of the first user is higher than the second priority of the second user based on determining that the first scheduled time and the second scheduled time overlap. The detection that the first scheduled time and the second scheduled time overlap is discussed in more detail at 710. The determination of the first priority of the first user and the second priority of the second user is described in detail in 706. In the example described in 706 the first priority of the first user (the father) is higher than the second priority of the second user (the child).

At 714, the control circuitry 504 determines that the conflict exists between the first request and the second request based on the determining that the first priority of the first user is higher than the second priority of the second user.

At 716, the control circuitry 716 generates for display, on the user equipment device, an indication of the conflict between the first request and the second request. In some embodiments, the viewing conflict 104 displayed on the user equipment device 106 displays metadata associated with the first media asset, e.g., "NYCFC v NYRB," and metadata associated with the second media asset, e.g., "Man of Steel." In some embodiments, the viewing conflict may also display an option to the first user to select the media asset he wishes to watch on the user equipment device 106.

Figure 8:
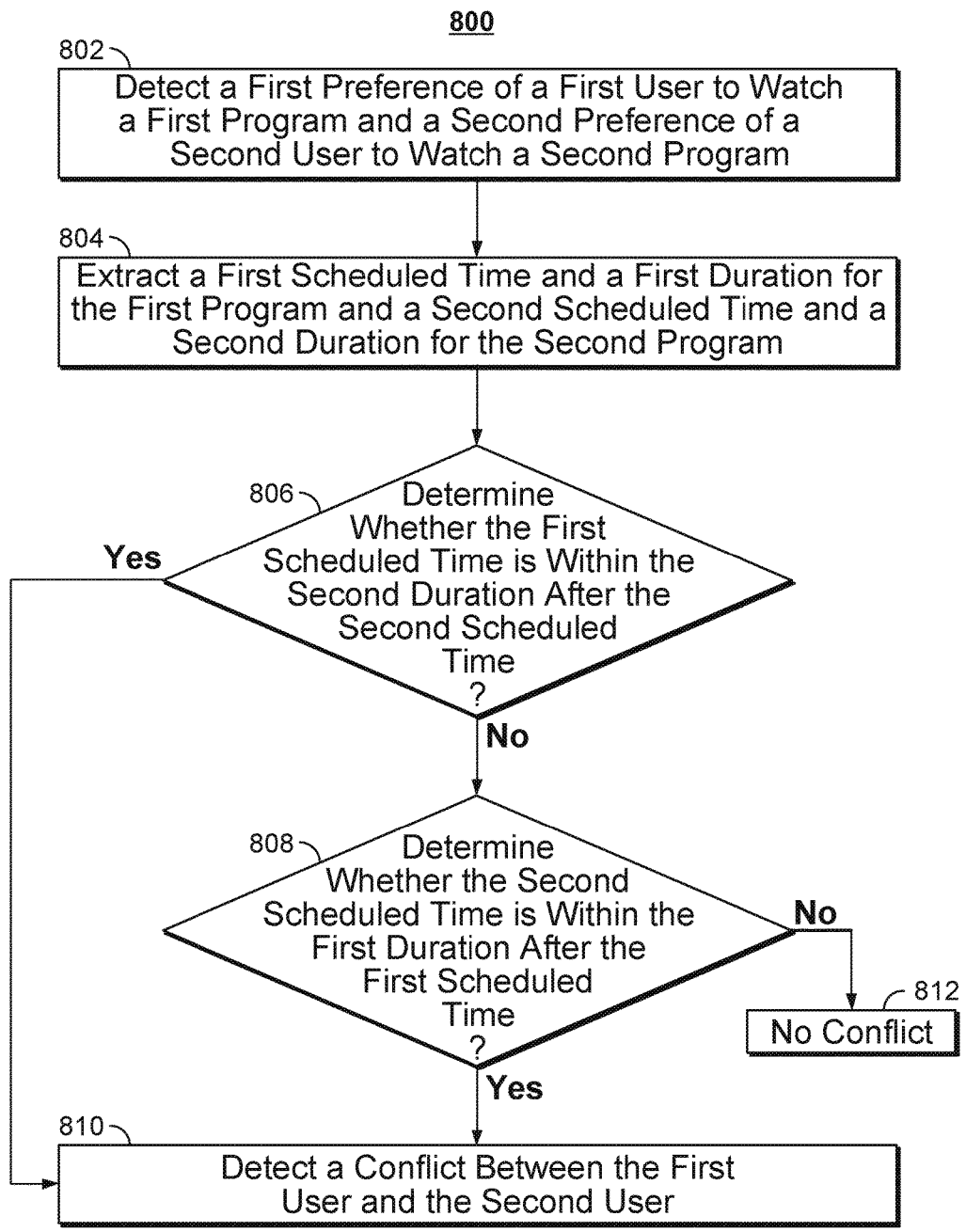
FIG. 8 depicts an illustrative flowchart of a process for detecting whether the scheduled time period of the first media asset and the second scheduled time period of the second media asset overlap, in accordance with some embodiments of the disclosure.

FIG. 8 depicts an illustrative flowchart of a process for detecting whether the scheduled time of the first media asset and the second scheduled time of the second media asset overlap, in accordance with some embodiments of the disclosure. Process 800 may be executed by control circuitry 504 (e.g., in a manner instructed to control circuitry 504 by the media guidance application). In some embodiments, FIG. 8 follows from FIG. 7 and replaces 710 in FIG. 7.

Process 800 begins at 802, when control circuitry detects a first preference of a first user to watch a first program and a second user's preference to watch a second program. In some embodiments, the first user watches a first media asset, e.g., "football game" (NYCFC v NYRB), on a user equipment device, the second user requests to display a second media asset, e.g., "Man of Steel," on the user equipment device.

At 804, control circuitry 504 extracts a first scheduled time and a first duration for the first program and a second scheduled time and a second duration for the second program. In some embodiments, the media guidance application may calculate the duration of the first media asset or the second media asset from the scheduled starting time and the scheduled ending time of the media asset.

At decision block 806, control circuitry 504 determines whether the first scheduled time is within the second duration after the second scheduled time. In case the first scheduled time is within the second duration after the second scheduled time, process 800 proceeds to 810 and detects a conflict between the first user and the second user. In case the first scheduled time is not within the second duration after the second scheduled time, process 800 proceeds to decision block 808 to determine whether the second scheduled time is within the first duration after the first scheduled time.

At decision block 808, the control circuitry 504 determines whether the second scheduled time is within the first duration after the first scheduled time. For example, as described in FIG. 1, the scheduled time of the first media asset ("NYCFC v NYRB") is 6 PM-8 PM and the scheduled time of the second media asset ("Man of Steel") has a second scheduled time of ("Man of Steel") 7 PM-9:30 PM. The scheduled time of the second media asset ("Man of Steel") is scheduled within the duration of the first media asset ("NYCFC v NYRB"). In case the second scheduled time is within the first duration after the first scheduled time, process 800 proceeds to 810 and detects a conflict between the first user and the second user. In case the second scheduled time is not within the first duration after the first scheduled time, process 800 proceeds to 812 and does not detect a viewing conflict between the first preference and the second preference.

At 810, the control circuitry 504 detects the conflict to between the first user and the second user. In some embodiments, the conflict is presented to the first user and the second user on user equipment device 106. In some embodiments, the viewing conflict 104 between the first user and the second user is displayed on the user equipment device 106 displays metadata associated with the first media asset, e.g., "NYCFC v NYRB," and metadata associated with the second media asset, e.g., "Man of Steel." In some embodiments, the viewing conflict may also display an option to the first user to select the media asset he wishes to watch on the user equipment device 106. In some embodiments, the viewing conflict notification shows that the second media asset, e.g.,"Man of Steel," requested by the second user replaces a first media asset, e.g., "NYCFC v NYRB," because the second priority assigned to the second user may be greater than the first priority assigned to the first user.

Figure 9:
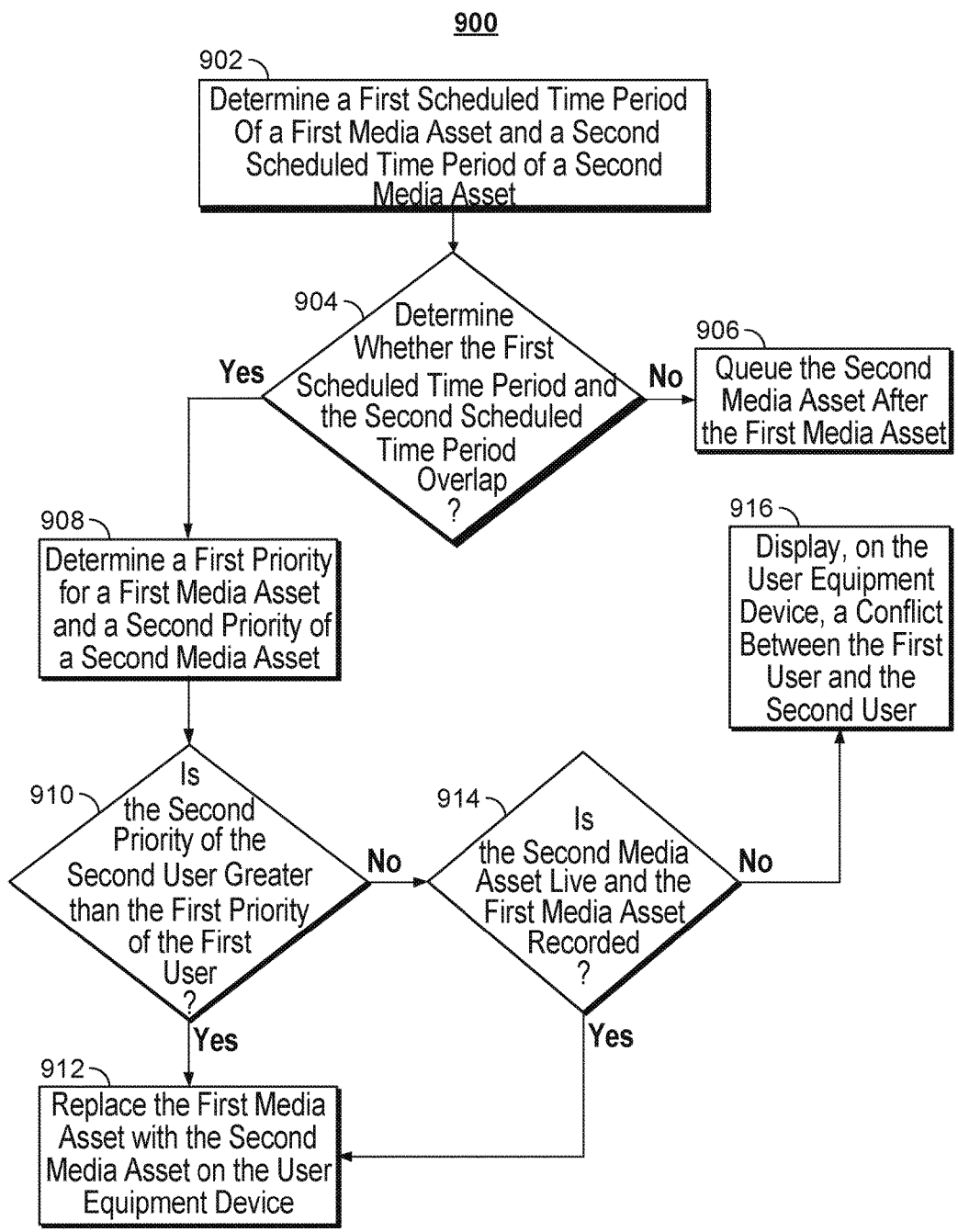
FIG. 9 depicts an illustrative flowchart of a process for detecting viewing conflicts based on user preferences, in accordance with some embodiments of the disclosure.

FIG. 9 depicts an illustrative flowchart of a process for detecting viewing conflicts based on user preferences, in accordance with some embodiments of the disclosure. Process 900 may be executed by control circuitry 504 (e.g., in a manner instructed to control circuitry 504 by the media guidance application). In some embodiments, FIG. 9 follows from FIG. 7 and replaces 712-716 in FIG. 7.

Process 900 begins at 902, when the control circuitry 504 determines a first scheduled time and a first duration of a first media asset and a second scheduled time and a second duration of a second media asset. The determination of the scheduled time and the scheduled duration is described in more detail in FIG. 8.

At decision block 904, the control circuitry 504 determines whether the first scheduled time period and the second scheduled time period overlap. The determination of whether the first scheduled time and the second scheduled time periods overlap is described in more detail in FIG. 8. In case the first scheduled time period and the second scheduled time period do not overlap, process 900 proceeds to 906, where the second media asset is queued after the first media asset. In case the first scheduled time and the second scheduled time overlap, process 900 proceeds to 908 to determine a first priority for a first media asset and a second priority of a second media asset.

At 908, control circuitry 504 determines a first priority for a first media asset and a second priority of a second media asset. In some embodiments, the priority associated with the first media asset may be a priority assigned to the first user requesting the first media asset. For example, as described in FIG. 1, the first user may be a father watching the football game ("NYCFC v NYRB"). The second user may be the child of the father and requests to watch the movie "Man of Steel." In such an example, the first user (father) may be assigned a first priority higher than the second priority assigned to the second user (child). In some embodiments, the first priority and second priority may be assigned based on a choice made by the first user and the second user. In some embodiments, the priority may be associated with the type of broadcast. For example, the media guidance application may be configured to assign a higher priority to a media asset that is being broadcast and a lower priority to a media asset that is recorded.

At decision block 910, the control circuitry 504 determines whether the second priority of the second user is greater than the first priority of the first user. In some embodiments, the priority associated with the first media asset may be a priority assigned to the first user requesting the first media asset. For example, as described in FIG. 2, the first user may be a child watching the football game ("NYCFC v NYRB"). The second user may be the father of the child and requests to watch the movie "Man of Steel." In such an example, the second user (father) may be assigned a second priority higher than the first priority assigned to the first user (child). In some embodiments, the first priority and second priority may be assigned based on a choice made by the first user and the second user. In case the second priority is greater than the first priority, process 900 movies to 912 to replace the first media asset, e.g., "NYCFC v NYRB," with the second media asset, e.g., "Man of Steel," on user equipment device 106. In some embodiments, the second user, e.g., the father, may be assigned a second priority lower than the first priority assigned to the first user, e.g., a child. In case the second priority is lower than the first priority, process 900 proceeds to 914 to determine whether the second media asset is live and the first media asset is recorded.

At 912, control circuitry 504 replaces the first media asset, e.g., "NYCFC v NYRB," with the second media asset, e.g., "Man of Steel." In some embodiments, the remaining part of the first media asset, e.g., "NYCFC v NYRB," is recorded by the media guidance application. In some embodiments, the viewing conflict notification shows that the second media asset, e.g., "Man of Steel," requested by the second user replaces a first media asset, e.g., "NYCFC v NYRB," because the second priority assigned to the second user may be greater than the first priority assigned to the first user.

At decision block 914, the control circuitry determines whether a second media asset is live and the first media asset is recorded. In some embodiments the media guidance application may be configured to prioritize live broadcasts of media assets over recorded media assets. In case the second media asset is broadcast live, the first media asset is replaced with the second media asset as described in 912. In case the second media asset is not live, process 900 proceeds to 916 to display on user equipment a conflict between the first user and the second user.

Assigning a higher priority to media assets being broadcast live is exemplary. In some embodiments, the media guidance application may be configured to assign a higher priority to recorded media assets and a lower priority to live media assets. In some embodiments, there may be media assets other than live and recorded that may be assigned different priorities in different situations. The assignment of the priorities to the media assets may be defined by users having access to the media guidance application.

At 916, the control circuitry 504, displays on user equipment device 106 a conflict between the first user and the second user. In some embodiments, the viewing conflict 104 between the first user and the second user is displayed on the user equipment device 106 displays metadata associated with the first media asset, e.g., "NYCFC v NYRB," and metadata associated with the second media asset, e.g., "Man of Steel." In some embodiments, the viewing conflict may also display an option to the first user to select the media asset he wishes to watch on the user equipment device 106.

It is contemplated that the steps or descriptions of FIGS. 7-9 may be used with any other embodiment of this disclosure. In addition, the descriptions described in relation to the algorithm of FIGS. 7-9 may be done in alternative orders or in parallel to further the purposes of this disclosure. For example, in step 914, the media guidance application may be configured to assign a higher priority to recorded media assets and a lower priority to live media assets for display. For example, in some embodiments, several instances of a variable may be evaluated in parallel, using multiple logical processor threads, or the algorithm may be enhanced by incorporating branch prediction. Furthermore, it should be noted that the process of FIGS. 7-9 may be implemented on a combination of appropriately configured software and hardware, and that any of the devices or equipment discussed in relation to FIGS. 5-6 could be used to implement one or more portions of the process.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method to detect a conflict between viewing selections of two users while viewing a media asset, the method comprising:
   generating for display, in response to a first request from a first user, a first media asset on a user equipment device;
   receiving a second request from a second user while the first media is being generated for display on the user equipment device, wherein the second request from the second user includes generating for display a second media asset on the user equipment device;
   determining a first priority associated with the first user and a second priority associated with the second user;
   determining a first scheduled time period of the first media asset and a second scheduled time period of the second media asset;
   determining whether a conflict exists between the first request and the second request by:
      detecting whether the first scheduled time period and the second scheduled time period overlap;
      in response to determining that the first scheduled time period and the second scheduled time period overlap,
         determining whether the first priority of the first user is higher than the second priority of the second user; and
      in response to determining that the first priority of the first user is higher than the second priority of the second user:
         determining that the conflict exists between the first request and the second request;
         generating for display, on the user equipment device, the second user's request to view the second media asset on the user equipment device, wherein the first user is prompted to accept or reject the second user's request to view the second media asset; and
         in response to receiving a rejection of the second user's request from the first user:
            recording the second media asset;
      in response to determining that the first priority of the first user is lower than the second priority of the second user:
         replacing the first media asset with the second media asset on the user equipment device; and
         recording a remaining portion of the first media asset.

2. The method of claim 1, wherein the determining whether the first scheduled time period and the second scheduled time period overlap comprises:
   extracting, from memory, a first scheduled time and a first duration of the first media asset and a second scheduled time and a second duration of the second media asset, from a first metadata of the first media asset and a second metadata of a second media asset, respectively;
   determining the conflict when the first scheduled time is within the second duration after the second scheduled time; and
   determining the conflict when the second scheduled time is within the first duration after the first scheduled time.

3. The method of claim 2, further comprising:
   queuing the second media asset to be generated for display on the user equipment device after the first media asset based on the determining that the second scheduled time is after the first duration after the first scheduled time.

4. The method of claim 1, wherein the first interaction is received through a first device and the second interaction is received through a second device, wherein the first device and the second device are connected to the user equipment device via a network.

5. The method of claim 2, wherein the generating for display the indication of the conflict between the first request and the second request comprises displaying the first metadata of the first media asset and the second metadata of the second media asset on the user equipment device.

6. The method of claim 1, wherein the determining of the first priority comprises:
   determining whether the first media asset is being broadcast live; and
   in response determining that the first media asset is being broadcast live, assigning the first priority a value higher than the second priority.

7. The method of claim 1, wherein the determining whether the conflict exists between the first request and the second request further comprises:
   in response determining that the first media asset is not being broadcast live, and the second media asset is being broadcast live, replacing the first media asset with the second media asset for display on the user equipment device.

8. The method of claim 1, wherein the determining whether the conflict exists between the first request and the second request further comprises:
receiving a first set of settings for generating the first media asset on the user equipment device from the first user;
receiving a second set of settings for generating the first media asset on the user equipment device from the second user;
determining a difference in at least one setting between the first set of settings and the second set of settings for generating the first media asset; and
generating for display on the user equipment device the conflict of the difference in at least one setting received from the first user and the second user.

9. A system to detect a conflict between viewing selections of two users while viewing a media asset, the system comprising:
control circuitry configured to:
generate for display, in response to a first request from a first user, a first media asset on a user equipment device;
receive a second request from a second user while the first media is being generated for display on the user equipment device, wherein the second request from the second user includes generating for display a second media asset on the user equipment device;
determine a first priority associated with the first user and a second priority associated with the second user;
determine a first scheduled time period of the first media asset and a second scheduled time period of the second media asset;
determine whether a conflict exists between the first request and the second request by:
detect whether the first scheduled time period and the second scheduled time period overlap;
in response to determining that the first scheduled time period and the second scheduled time period overlap, determine whether the first priority of the first user is higher than the second priority of the second user; and
in response to determining that the first priority of the first user is higher than the second priority of the second user:
determine that the conflict exists between the first request and the second request;
generating for display, on the user equipment device, the second user's request to view the second media asset on the user equipment device, wherein the first user is prompted to accept or reject the second user's request to view the second media asset; and
in response to receiving a rejection of the second user's request from the first user:
recording the second media asset
in response to determining that the first priority of the first user is lower than the second priority of the second user:
replacing the first media asset with the second media asset on the user equipment device; and
recording a remaining portion of the first media asset.

10. The system of claim 9, wherein the control circuitry configured to determine whether the first scheduled time period and the second scheduled time period overlap is further configured to:
extract, from memory, a first scheduled time and a first duration of the first media asset and a second scheduled time and a second duration of the second media asset, from a first metadata of the first media asset and a second metadata of a second media asset, respectively;
determine the conflict when the first scheduled time is within the second duration after the second scheduled time; and
determine the conflict when the second scheduled time is within the first duration after the first scheduled time.

11. The system of claim 10, wherein the control circuitry is further configured to:
queue the second media asset to be generated for display on the user equipment device after the first media asset based on the determining that the second scheduled time is after the first duration after the first scheduled time.

12. The system of claim 9, wherein the first interaction is received through a first device and the second interaction is received through a second device, wherein the first device and the second device are connected to the user equipment device via a network.

13. The system of claim 10, wherein the control circuitry configured to generate for display the indication of the conflict between the first request and the second request is further configured to display the first metadata of the first media asset and the second metadata of the second media asset on the user equipment device.

14. The system of claim 9, wherein the control circuitry configured to determine the first priority is further configured to:
determine whether the first media asset is being broadcast live; and
in response determining that the first media asset is being broadcast live, assign the first priority a value higher than the second priority.

15. The system of claim 9, wherein the control circuitry configured to determine whether the conflict exists between the first request and the second request is further configured to:
in response determining that the first media asset is not being broadcast live, and the second media asset is being broadcast live, replace the first media asset with the second media asset for display on the user equipment device.

16. The system of claim 9, wherein the control circuitry configured to determine whether the conflict exists between the first request and the second request is further configured to:
receive a first set of settings for generating the first media asset on the user equipment device from the first user;
receive a second set of settings for generating the first media asset on the user equipment device from the second user;
determine a difference in at least one setting between the first set of settings and the second set of settings for generating the first media asset; and
generate for display on the user equipment device the conflict of the difference in at least one setting received from the first user and the second user.

* * * * *